United States Patent
Zong et al.

(10) Patent No.: US 12,197,633 B2
(45) Date of Patent: Jan. 14, 2025

(54) MIXED REALITY HIGH-SIMULATION BATTLEFIELD FIRST AID TRAINING PLATFORM AND TRAINING METHOD USING SAME

(71) Applicant: ARMY MEDICAL UNIVERSITY, PEOPLE'S LIBERATION ARMY, PRC, Chongqing (CN)

(72) Inventors: Zhaowen Zong, Chongqing (CN); Wenqiong Du, Chongqing (CN); Yijun Jia, Chongqing (CN); Zhao Ye, Chongqing (CN); Renqing Jiang, Chongqing (CN); Xin Zhong, Chongqing (CN); Xiaolin Zhou, Chongqing (CN)

(73) Assignee: ARMY MEDICAL UNIVERSITY, PEOPLE'S LIBERATION ARMY, PRC, Chongqing (CN)

( * ) Notice: Subject to any disclaimer, the term of this patent is extended or adjusted under 35 U.S.C. 154(b) by 208 days.

(21) Appl. No.: 18/011,099

(22) PCT Filed: Sep. 22, 2020

(86) PCT No.: PCT/CN2020/116755
§ 371 (c)(1),
(2) Date: Dec. 16, 2022

(87) PCT Pub. No.: WO2022/056941
PCT Pub. Date: Mar. 24, 2022

(65) Prior Publication Data
US 2023/0244299 A1 Aug. 3, 2023

(30) Foreign Application Priority Data

Sep. 17, 2020 (CN) .......................... 202010983199.X

(51) Int. Cl.
*G06T 19/00* (2011.01)
*G06F 3/01* (2006.01)
*A63F 13/20* (2014.01)

(52) U.S. Cl.
CPC ............ *G06F 3/011* (2013.01); *G06T 19/006* (2013.01); *A63F 13/20* (2014.09)

(58) Field of Classification Search
CPC . G06T 19/006; G06T 19/003; G06T 2210/41; G06T 13/20; G06T 15/00;
(Continued)

(56) References Cited

U.S. PATENT DOCUMENTS 10,854,098 B1 * 12/2020 Welch .................. G09B 5/02
2018/0293802 A1 * 10/2018 Hendricks .............. G09B 23/30

FOREIGN PATENT DOCUMENTS

| CN | 101174332 A | 5/2008 |
| CN | 101964019 A | 2/2011 |

(Continued)

OTHER PUBLICATIONS

Brown et al. ("Enhancing Combat Medic Training with 3D Virtual Environments" retrieved from IEEE, https://ieeexplore.ieee.org/abstract/document/7586266, May 2016 (Year: 2016).*

(Continued)

*Primary Examiner* — Hau H Nguyen
(74) *Attorney, Agent, or Firm* — Polsinelli PC

(57) ABSTRACT

The mixed reality high-simulation battlefield first aid training platform includes a hardware part and a software part; the hardware part includes a data processing system, a real-time monitoring system, a head-mounted display device, an intelligent shooting instrument, a wearable sensing instrument, and a manipulation handle; the software part includes a 3D battlefield scene simulation system, a 3D wounded simulation system, a wounded rescue decision system, and a movable large space team cooperation and virtual interaction system; the 3D battlefield scene simulation system includes a geographic environment 3D model and a battle scene 3D model; the data processing system includes a PC terminal having a wireless communication module. A battlefield environment can be highly simulated; a full-process experience including battles with enemies, (Continued)

wounded arising, rescue implementation, and tactical mission completion is provided; battlefield rescue decision and team cooperation training are highlighted.

14 Claims, 3 Drawing Sheets

(58) Field of Classification Search
CPC ......... G06T 17/05; G06T 17/00; G06F 3/012; G06F 3/011; G06F 3/016; A63F 13/20; A63F 13/837; G09B 9/003
See application file for complete search history.

(56) References Cited

FOREIGN PATENT DOCUMENTS

| | | |
|---|---|---|
| CN | 106055113 A | 10/2016 |
| CN | 110910511 A | 3/2020 |
| CN | 111508285 A | 8/2020 |
| KR | 20180031984 A | 3/2018 |

OTHER PUBLICATIONS

International Application No. PCT/CN2020/116755, International Search Report dated May 28, 2021, 4 pages.

\* cited by examiner

MIXED REALITY HIGH-SIMULATION BATTLEFIELD FIRST AID TRAINING PLATFORM AND TRAINING METHOD USING SAME

CROSS-REFERENCE TO RELATED APPLICATION

This application is a national stage of International Application No. PCT/CN2020/116755, filed on Sep. 22, 2020, which claims priority to Chinese Patent Application No. 202010983199.X, filed on Sep. 17, 2020. Both of the aforementioned applications are hereby incorporated by reference in their entireties.

TECHNICAL FIELD

The present disclosure relates to the technical fields of virtuality and reality combination and training tools, and specifically relates to a mixed reality high-simulation battlefield first aid training platform and a training method using same.

BACKGROUND

In recent years, deep cross fusion of emerging technologies and the medical field accelerates and promotes reformation of medical education and teaching. The New Media Alliance Horizon Report: 2019 Edition of Higher Education indicates that six technologies such as mobile learning, analytic technology, mixed reality (MR), artificial intelligence, block chains and virtual assistants will become key technologies for promoting higher education and training. The MR can achieve interaction between the user and the real world and between the user and the virtual world and content interaction between the virtual world and the real world through a virtuality and reality combination visual environment generated by a computer, image processing, a manual interaction technology and the like. The battlefield first aid training has own particularity. For example, the war rescue technology needs to be combined with the tactical background for training, and team cooperation is often needed to complete the training. Furthermore, self-rescue and mutual rescue of battle wounds are implemented by battle personnel in many cases, but the battle personnel without medical background usually lack rescue decision knowledge of battlefield first aid.

Aiming at the particularity of battlefield first aid, it is necessary to establish a high-simulation battle wound self-rescue and mutual rescue training platform taking a specific environment (such as a highland or an island) as a tactical background and taking mixed reality as a basis, and a corresponding training method is provided to train battle personnel in battlefield first aid to be quick and accurate in decision making and team cooperation ability.

SUMMARY

Therefore, the present disclosure aims to provide a movable mixed reality high-simulation battlefield first aid training platform based on team cooperation taking highland battles as the background. The platform can achieve training and assessment of trainees in two modes such as a training mode and an assessment mode. The platform is additionally provided with a monitoring system, a positioning system and a transmission system. The teacher can display or switch rescue operation interfaces of different trainees in real time according to needs, and can also display an overall interface of a multi-person cooperative rescue scene in the training process from a visual angle of the God, so that observation, guidance, demonstration and teaching requirements of the teacher on the training process are realized. Moreover, a standard training method is provided for full-process experience training, and the problems in the prior art that the tactical background is separated from battle rescue training, the trainees generally lack correct battlefield first aid decisions under the tactical background, and organization implementation and team cooperation capabilities in the rescue process are insufficient are solved.

Firstly, the present disclosure is realized through the following technical solutions.

A mixed reality high-simulation battlefield first aid training platform is provided. The mixed reality high-simulation battlefield first aid training platform includes a hardware part and a software part; the hardware part includes a data processing system, a real-time monitoring system, a head-mounted display device, an intelligent shooting instrument, a wearable sensing instrument, and a manipulation handle; the software part includes a 3D battlefield scene simulation system, a 3D wounded simulation system, a wounded rescue decision system, and a movable large space team cooperation and virtual interaction system;

the 3D battlefield scene simulation system includes a geographic environment 3D model and a battle scene 3D model;

the geographic environment 3D model includes a terrain layer, a ground surface layer, a vegetation layer, a building layer and an environment layer; the terrain layer is used for restoring a terrain structure and a form of training environment; the ground surface layer is used for restoring ground surface form; the vegetation layer is used for restoring vegetation conditions; the building layer is used for restoring a building structure and appearance; the environment layer is used for restoring ambient light and weather;

the battle scene 3D model includes battle persons, weapon equipment, battle cooperation, battle atmosphere creation, a battle process and the like;

the 3D wounded simulation system performs high-simulation wounded simulation through a 3D next-generation modeling technology, performs 1:1 simulation on a size, a shape and a color of a wound surface, and represents dynamic wounded conditions by setting dynamic conditions to trigger and call animations corresponding to different wounded conditions;

the wounded rescue decision system forms a training system structure diagram according to a self-rescue and mutual rescue decision process, and then a visual graphic editing environment provided by a virtual engine UE4 is used for programming and training a personnel battlefield first aid decision-making ability;

according to the movable large space team cooperation and virtual interaction system, virtual world root points of all battle persons are anchored to anchoring points of real world through a space anchoring sharing core technology and an inside-out tracking positioning technology, so that the battle persons at different positions complete error-free multi-person interaction relative to virtual position and real position to achieve team cooperation;

the data processing system includes a PC terminal in wireless connection with the real-time monitoring system, the head-mounted display device, the intelligent shooting instrument, the wearable sensing instrument and the manipulation handle; the PC terminal is provided with a wireless communication module; the wireless communication module is used for receiving monitoring information or a handle instruction and sending out a shooting instruction, a wearable sensing instruction and a head-mounted display instruction;

the real-time monitoring system includes an audio and video acquisition device, an audio and video transmission device and a storage device; the audio and video acquisition device performs whole-process camera shooting on whole appearance and walking space of a trained person; the audio and video transmission device receives a signal and transmits the signal to the PC terminal;

the head-mounted display device is worn on a head of a human body and is connected with the PC terminal through wireless communication to provide a virtual picture;

the intelligent shooting instrument includes a firearm, a cartridge holder replacing simulation device and a recoil force simulation device arranged on the firearm; cartridge holder replacing operation is sensed through the cartridge holder replacing simulation device; acting counterforce of 6 N/cm2 is generated on the human body through the recoil force simulation device; and the wearable sensing instrument includes a tactical vest and a hit sensing device arranged on the tactical vest.

Further, the 3D wounded simulation system presents the shape of the wound surface through real normals and maps, depicts convex-concave changes of the wound surface with normal maps, represents the color and texture of the wound surface with colored maps, and represents quality of the wound surface under light irradiation condition with highlight maps.

Further, the cartridge holder replacing simulation device includes a touch sensor arranged on the firearm, and the touch sensor interacts with the data processing system through wireless communication.

Further, the recoil force simulation device includes a fixed seat fixed to a tail portion of the firearm and an impact rod; a magnetic force generation cavity coaxially arranged with an axis direction of the firearm is formed in the fixed seat; an opening is formed in an end, away from the firearm, of the magnetic force generation cavity; an end of the impact rod is arranged in the magnetic force generation cavity through the opening, and an other end of the impact rod extends out of a cylinder body; an iron piston is arranged at the end, in the cylinder body, of the impact rod; an electromagnet is arranged in a cavity formed by the iron piston and the opening; the electromagnet is annularly sleeved on the impact rod; an annular space is formed between the electromagnet and the impact rod; a reset spring is arranged in the annular space; and an impact handle is arranged at the other end, extending out of the cylinder body, of the impact rod.

Further, a plurality of hit sensing devices are provided, and evenly distributed on a same circumference of the tactical vest.

Further, the hit sensing device includes a micro vibration motor, a vibration power supply and an electromagnetic switch valve, and the electromagnetic switch valve wirelessly communicates with the data processing system.

Secondly, the present disclosure is realized through the following technical solutions.

According to a training method using the mixed reality high-simulation battlefield first aid training platform, the virtual world root points of all participants are anchored to the anchoring points of the real world through a space anchoring sharing technology, so that the participants at different positions complete error-free multi-person interaction relative to the virtual position and the real position, and then large-space team cooperation training is performed in combination with an inside-out tracking positioning method; and the specific training method includes the following steps:

wearing the display device, creating a room in a virtual world of the display device through the manipulation handle, selecting a mode and a level, and waiting for team members;

entering all team members to a preparation area in a real world after gathering is completed;

entering a team leader to the preparation area to confirm normal wireless communication of each hardware and normal use of each software, and triggering a start area to start training;

according to display of the display device, enabling the team members to travel in the real world and to be synchronous with the virtual world, shooting and avoiding enemies through enemy AI, sensing behavior of shooting through the recoil force simulation device, sensing a hit signal through the hit sensing device, and triggering a wounded event;

processing wounded condition information and direction information by the PC terminal and then immediately transmitting processed information to the team leader through the 3D wounded simulation system when one of the team members falls to ground after the one is hit, and giving a wounded rescue command by the team leader according to immediate conditions;

making a comprehensive determination by assigned rescue personnel according to enemy's situations, self-situations, battlefield environment and other situations to implement rescue; and completing rescue;

wherein if the mode is a training mode, completing a tactical task and finishing the rescue is an end of the training; and if the mode is an assessment mode, team scoring in aspects of organizing, commanding and team cooperation, tactical task completion and rescue task completion are performed, and finishing the team scoring is an end of the training.

Further, according to the space anchoring sharing technology, 3D center positioning is performed on each real site through a VR device, data alignment is performed on physical center 3D coordinates and virtual world center 3D coordinates of the real site through a processor, and finally a C/S server is established through a network to synchronize the virtual world center 3D coordinates of the team members; and aligned coordinates of virtual space and real world of each team member are calculated to perform data synchronization in 3D space and 3D display in VR space.

Further, a feedback method of wounded directions and feedback force includes following steps: establishing a military azimuth coordinate system by taking a position of the team member as a coordinate center, performing reference calculation by taking military azimuth coordinates of 0-6000 to correspond to 360 degrees so that any azimuth coordinate value corresponds to an angle value, arranging force feedback devices on a circumference of the tactical vest at certain angle intervals, and sending out feedback information by one corresponding force feedback device in a wounded direction which is an included angle between an attacking direction of an attacker and an attacked person in the coordinate system.

The present disclosure has the following beneficial effects.

Through virtuality and reality combination hardware and software development and combined application, high fusion of the real world and the virtual world is realized. A battlefield environment is highly simulated. A full-process experience including battles with enemies, wounded arising, rescue implementation, and tactical mission completion is provided. Battlefield rescue decision and team cooperation training are highlighted. The virtuality and reality combination immersive training and sensing effects are enhanced under the support of technologies such as mixed reality. The battlefield first aid decisions and team cooperation training and assessment can be realized, the bottleneck problem that tactical backgrounds and team cooperation training are lacked in the battlefield first aid training is solved, and the practical application level of self-rescue and mutual rescue is improved.

Figure 1:
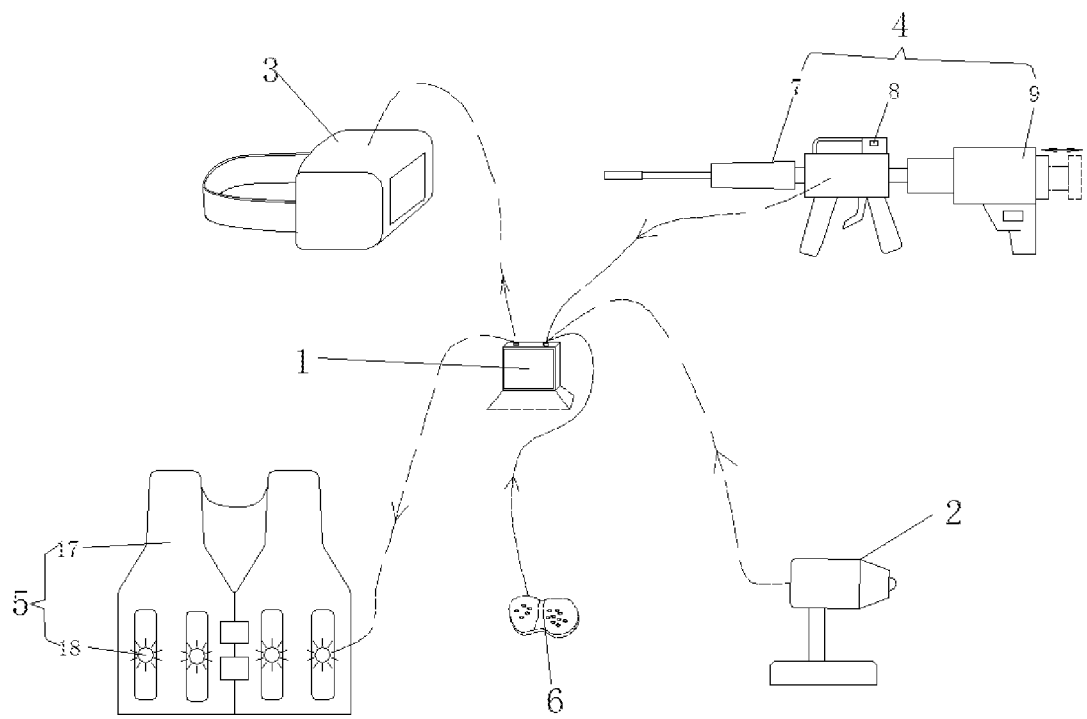
FIG. 1 is a structural schematic diagram of the present disclosure.
Figure 2:
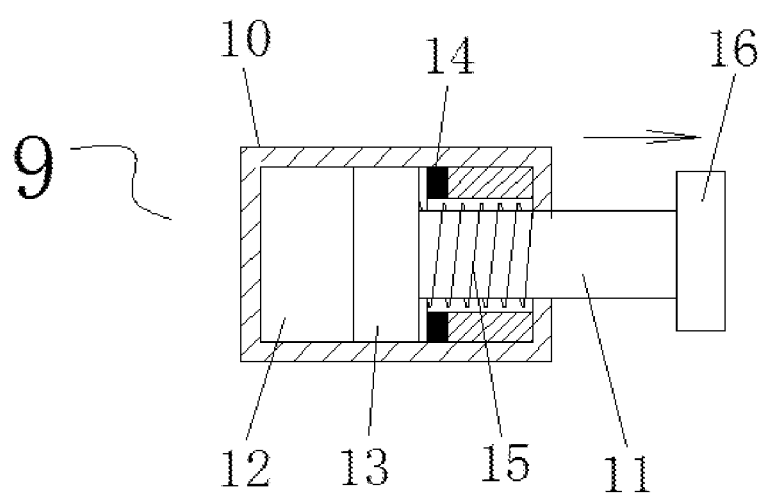
FIG. 2 is a schematic diagram showing a recoil force simulation device in operation.
Figure 3:
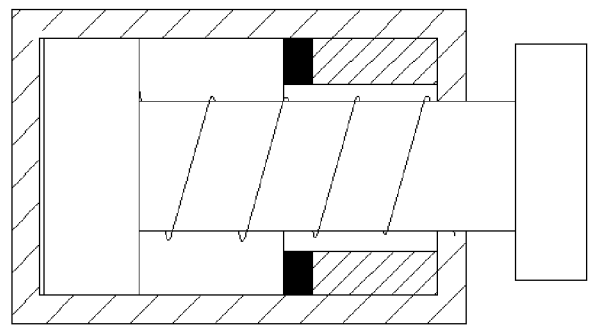
FIG. 3 is a schematic diagram showing the recoil force simulation device not in operation.

REFERENCE NUMERALS 1, data processing system; 2, real-time monitoring system; 3, head-mounted display device; 4, intelligent shooting instrument; 5, wearable sensing instrument; 6, manipulation handle; 7, firearm; 8, touch sensor; 9, recoil force simulation device; 10, fixed seat; 11, impact rod; 12, magnetic force generation cavity; 13, iron piston; 14, electromagnet; 15, reset spring; 16, impact handle; 17, tactical vest; and 18, hit sensing device.

DETAILED DESCRIPTION OF THE EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. Generally, the described and illustrated components of the embodiments of the present disclosure in the accompanying drawings can be arranged and designed through various different configurations.

Therefore, the detailed description of the embodiments of the present disclosure provided in the accompanying drawings is not intended to restrict the protected scope of the present disclosure, but merely represents the selected embodiment of the present disclosure. Based on the embodiment in the present disclosure, all other embodiments obtained by the ordinary technical staff in the art under the premise of without contributing creative labor belong to the scope protected by the present disclosure.

It is noted that similar labels and alphabets represent similar items in the following accompanying drawings, and thus, once a certain item is defined in one figure, the item does not need to be further defined and described in the following figures.

In the description of the present disclosure, it needs to be illustrated that the indicative direction or position relations of the terms such as "one side" and "the other side" are direction or position relations illustrated based on the accompanying drawings, or the frequently placing direction or position relations when the product in the present disclosure is used, just for facilitating the description of the present disclosure and simplifying the description, but not for indicating or hinting that the indicated device or element must be in a specific direction and is constructed and operated in the specific direction, the terms cannot be understood as the restriction of the present disclosure. Moreover, the terms such as "first" and "second" are just used for distinguishing the description, but cannot be understood to indicate or hint relative importance.

Moreover, the term such as "same" does not represent that the components need to be the same absolutely, but the components can be slightly different. The term "vertical" just indicates that the position relationship between components is relatively vertical relative to 'parallel", but does not represent that the structure must be completely vertical and can be slightly inclined.

As shown in FIG. 1 to FIG. 6, a mixed reality high-simulation battlefield first aid training platform in the embodiment includes a hardware part and a software part. The hardware part is used for acquiring and displaying information, and the software part is used for analyzing and processing information, realizing virtual reality and providing decisions. Specifically, the hardware part may include a data processing system 1, a real-time monitoring system 2, a head-mounted display device 3, an intelligent shooting instrument 4, a wearable sensing instrument 5, and a manipulation handle 6. The software part may include a 3D battlefield scene simulation system, a 3D wounded simulation system, a wounded rescue decision system, and a movable large space team cooperation and virtual interaction system.

The 3D battlefield scene simulation system in the embodiment includes a geographic environment 3D model and a battle scene 3D model. The geographic environment 3D model can be expressed in multiple layers. Generally, the geographic environment 3D model can be divided into 2 to 10 layers. As a preferred embodiment, the geographic environment 3D model is divided into five layers which specifically include a terrain layer, a ground surface layer, a vegetation layer, a building layer and an environment layer. The terrain layer is generated and restored through a high-precision ground restoration technology and a three-dimensional terrain generation algorithm based on contour line integration. The ground surface layer is manufactured by adopting a composite material ball technology on the basis of sampling and analyzing ground surface materials. The vegetation layer and the building layer are manufactured by using a next-generation modeling technology according to the simulated battlefield vegetation condition, the training task and the expected enemy target condition. The environment layer is mainly used for simulating real environment light and weather corresponding to different battle times according to training contents.

The battle scene 3D model in the embodiment includes high-precision figures, equipment, transportation tools and other models built through the next-generation modeling technology. After the models are built, simulated object state parameters are judged based on related system operation variables and conditions, and animations are output through system operation and resource calling. The figures, equipment and transportation tools can be displayed in the display device in real time, and the real world and the virtual world are kept synchronous.

The 3D wounded simulation system in the embodiment performs 1:1 simulation on the size, shape and color of a wound surface through the 3D next-generation modeling technology. According to the specific manufacturing process, the system presents the shape of the wound surface through real normals and maps, depicts the convex-concave change of the wound surface with normal maps, represents the color and texture of the wound surface with colored maps, and represents the quality of the wound surface under the light irradiation condition with highlight maps. Moreover, the dynamic wounded conditions are represented by setting dynamic conditions to trigger and call animations corresponding to different wounded conditions.

In the system, eight core wounded conditions such as limb hemorrhage, airway obstruction, tension pneumothorax, open pneumothorax, maxillofacial burn, intestinal prolapse, open fracture and closed fracture are provided. The first four core wounded conditions are main wounded conditions causing preventable battlefield death and are key contents of battlefield first aid, and the last four core wounded conditions are relatively common wounded conditions on battlefields, and some wounded conditions need to be subjected to intensive training.

In the embodiment, the wounded rescue decision system forms a training system structure diagram according to a self-rescue and mutual rescue decision process, and then a visual graphic editing environment provided by a virtual engine UE4 is used for software programming and training a personnel battlefield first aid decision-making ability.

In order to achieve team cooperation training in a large space and synchronization of the real world and the virtual world, virtual world root points of all battle persons are anchored to anchoring points of the real world by means of a space anchoring sharing core technology and an anchoring revision algorithm. Therefore, the battle persons at different positions can complete error-free multi-person interaction relative to the virtual position and the real position. On this basis, an inside-out tracking positioning method and a knapsack computer calculation unit are combined to develop the large space team cooperation and virtual interaction system suitable for the simulation training system environment, so that the platform is suitable for both single-person training and team cooperation training, and the specific working principle is further elaborated in the training method.

The data processing system in the embodiment includes a PC terminal and a server. Due to the fact that the real-time 3D technology is adopted, a running system of the PC terminal needs high memory and video memory as well as high-performance CPU and video card. The PC terminal is provided with a wireless communication module. The wireless communication module realizes wireless communication with the real-time monitoring system, the head-mounted display device, the intelligent shooting instrument, the wearable sensing instrument and the manipulation handle, and is used for receiving monitoring information or a handle instruction and sending out a shooting instruction, a wearable sensing instruction and a head-mounted display instruction.

The real-time monitoring system in the embodiment includes an audio and video acquisition device, an audio and video transmission device and a storage device. The audio and video acquisition device performs whole-process camera shooting on the whole appearance and walking space of a training person. The audio and video transmission device receives a signal and transmits the signal to the PC terminal.

The head-mounted display device in the embodiment is worn on the head of a human body and is connected with the PC terminal and the server through wireless communication to provide a virtual picture. The terrain, shelter and enemy conditions can be scouted.

The intelligent shooting instrument in the embodiment includes a firearm 7, a cartridge holder replacing simulation device and a recoil force simulation device 9 arranged on the firearm. Cartridge holder replacing operation can be sensed through the cartridge holder replacing simulation device. Acting counterforce of 6 $N/cm^2$ can be generated on the human body through the recoil force simulation device. The firearm can be modified from a rifle or other handheld firearms.

Further, the cartridge holder replacing simulation device includes a touch sensor 8 arranged on the firearm. During shooting, cartridge holder replacing simulation is performed by slapping the bottom of a cartridge holder. The touch sensor interacts with the data processing system through wireless communication.

Furthermore, the recoil force simulation device includes a fixed seat 10 fixed to the tail portion of the firearm and an impact rod 11. The fixed seat is connected with the firearm through screws. A magnetic force generation cavity 12 coaxially arranged with the axis direction of the firearm is formed in the fixed seat. An opening is formed in the end, away from the firearm, of the magnetic force generation cavity. One end of the impact rod is arranged in the magnetic force generation cavity through the opening, and the other end of the impact rod extends out of a cylinder body. An iron piston 13 is arranged at the end, in the cylinder body, of the impact rod. An electromagnet 14 is arranged in a cavity formed by the iron piston and the opening. The electromagnet is annularly sleeved on the periphery of the impact rod. An annular space is formed between the electromagnet and the impact rod. A reset spring 15 is arranged in the annular space. One end of the reset spring acts on the inner wall of the annular space, and the other end of the reset spring acts on the end face of the piston. The piston is in a contracted state under the action of elastic force. When the piston is used, the electromagnet can be electrified to generate suction force to the piston and overcome elastic restoring force. The impact rod extends out of the cylinder body to generate recoil force to a human body. Furthermore, an impact handle 16 is arranged at the end, extending out of the cylinder body, of the impact rod, so that the pressure intensity can be reduced, and the comfort is improved.

In the embodiment, the wearable sensing instrument includes a tactical vest 17 and hit sensing devices 18 arranged on the tactical vest. A plurality of hit sensing devices are provided, and the hit sensing devices are evenly distributed on the same circumference of the tactical vest, so that a plurality of generation direction areas are formed on the circumference of the tactical vest, and information hit from different areas can be conveniently received. Specifically, the hit sensing device includes a micro vibration motor, a vibration power supply and an electromagnetic switch valve, and the electromagnetic switch valve wirelessly communicates with the data processing system. When the processing system sends out information, the electromagnetic switch valve is opened, and the micro vibration motor works. The human body feels hit information, and therefore, corresponding actions such as falling down are made. The number of the hit sensing devices is not limited, and a plurality of hit sensing devices can be provided. In the embodiment, six hit sensing devices are evenly distributed on the tactical vest.

A training method using the mixed reality high-simulation battlefield first aid training platform includes the following steps:

firstly, wearing a display device, creating a room in the virtual world of the display device through a manipulation handle, selecting a mode and a level, and waiting for team members;

secondly, after gathering is completed, all team members entering a preparation area in the real world;

thirdly, a team leader entering the preparation area, confirming normal wireless communication of each hardware and normal use of each software, and triggering a start area to train;

fourthly, according to the display of the display device, the team members traveling in a real scene and being synchronous with the virtual world, shooting and avoiding the enemy through enemy AI, sensing the shooting behavior through the recoil force simulation device, sensing a hit signal through the hit sensing devices, and triggering a wounded event;

fifthly, processing the wounded condition information and the direction information by a PC terminal and then immediately transmitting the processed information to the team leader through a 3D wounded simulation system when one of the team members falls to the ground after the one is hit, and the team leader giving a wounded rescue command according to the immediate condition;

sixthly, making a comprehensive determination by the assigned rescue personnel according to enemy's situation, self-situation, battlefield environment and other situations to implement rescue;

seventhly, completing rescue; and eighthly, if the mode is a training mode, completing the tactical task and finish the rescue is an end of the training; and if the mode is an assessment mode, performing team scoring in the aspects of organizing, commanding and team cooperation, tactical task completion and rescue task completion, and finishing the team scoring is an end of the training.

In order to realize large space team cooperation training and synchronization of the real world and the virtual world, the inventor develops the large space team cooperation and virtual interaction system. The system is developed by means of the space anchoring sharing core technology, the inside-out tracking positioning technology, an anchoring revision algorithm and a knapsack computer calculation unit, so that the platform is suitable for both single-person training and team cooperation training.

The concrete contents of the space anchoring sharing technology are as follows.

Figure 4:
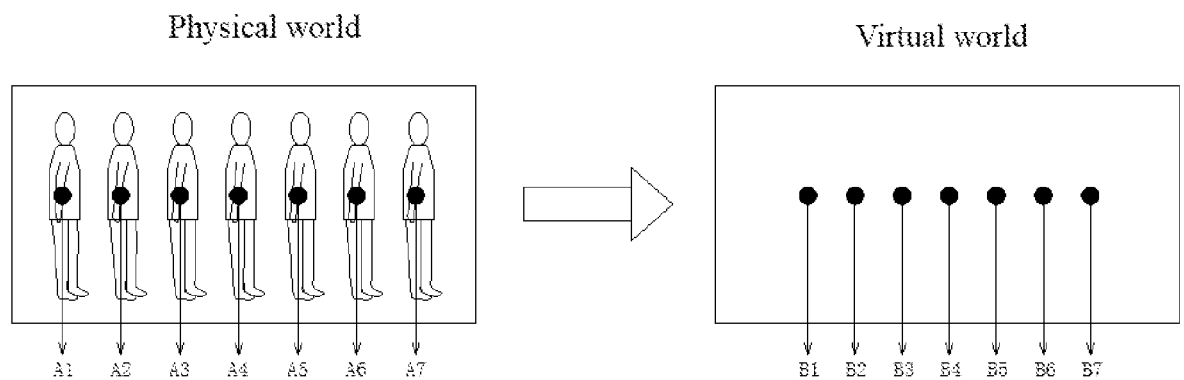
FIG. 4 is a schematic diagram of a space anchoring sharing technology.

3D center positioning is performed on each real site through a VR device, data alignment is performed on the physical center 3D coordinates and the virtual world center 3D coordinates of the real site through a processor, and finally a C/S server is established through a network to synchronize the virtual world center 3D coordinates of each team member; and the aligned coordinates of the virtual space and the real world of each team member are calculated to perform data synchronization in the 3D space and 3D display in the VR space. As shown in FIG. 4, seven team members exist in the physical world, and the physical coordinates are A1, A2, A3, . . . and A7 respectively. A1 of the physical world corresponds to B1 of the virtual world and A2 of the physical world corresponds to B2 of the virtual world until A7 corresponds to B7, so that one-to-one correspondence is achieved. Finally, the environment in the physical world corresponds to the virtual world according to a certain proportion. Therefore, direct fitting of the real world and the virtual world is realized, and the mixed reality world is formed.

The concrete contents of the inside-out tracking technology are as follows.

Figure 5:
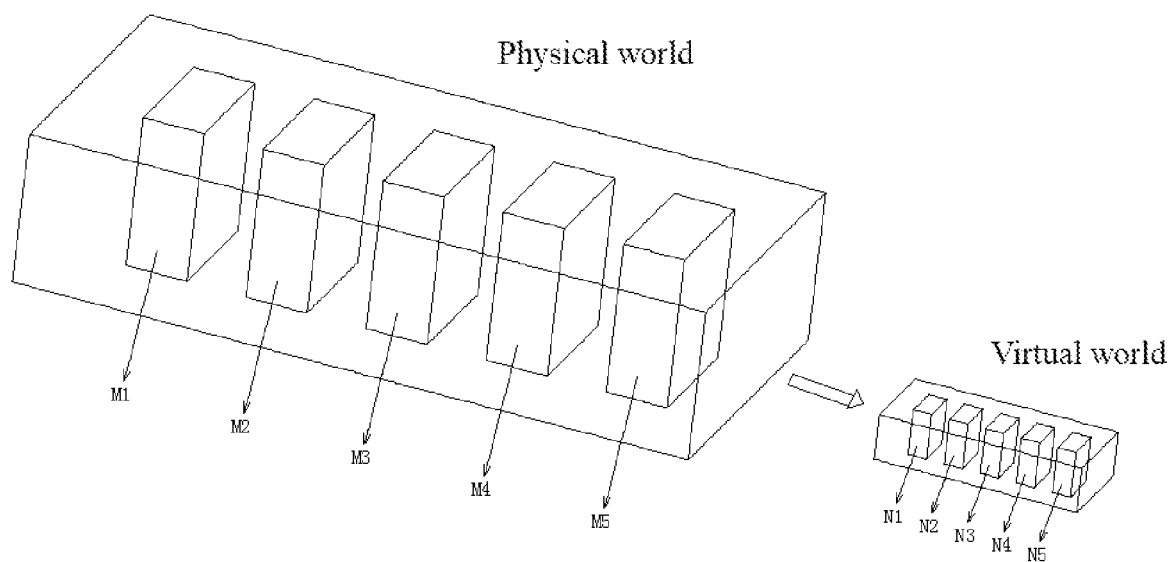
FIG. 5 is a schematic diagram of an inside-out tracking technology.

Position tracking is achieved through an environment sensing camera, a depth camera, an inertial measurement unit and other components. Therefore, the position and motion state of the user are tracked and positioned. According to the embodiment of the present disclosure, the audio and video acquisition device can be an environment sensing camera, a depth camera, an inertial measurement unit and other components, and can be used for comprehensively tracking and positioning users in a small area or a large space. During implementation, an area where training personnel in the physical world are located is designated as a barrier-free space. The barrier-free space corresponds to the virtual space, and trainees can move freely in the barrier-free space. When the trainees get close to one another too much, the system finds an alarm to remind the trainees, so that multi-team cooperation work is realized, and mutual collision and interference conditions are avoided. As shown in FIG. 5, five barrier-free spaces of M1, M2, M3, M4, M5 in the physical world correspond to five virtual spaces of N1, N2, N3, N4, N5 in the virtual world.

During training, a feedback method of wounded directions and feedback force includes the following steps: establishing a military azimuth coordinate system by taking the position of a team member as a coordinate center, performing reference calculation by taking the military azimuth coordinates of 0-6000 to correspond to 360 degrees so that any azimuth coordinate value corresponds to an angle value, arranging force feedback devices on the circumference of the tactical vest at certain angle intervals, and sending out feedback information by the force feedback device in the wounded direction which is an included angle between the attacking direction of an attacker and an attacked person in the coordinate system.

Figure 6:
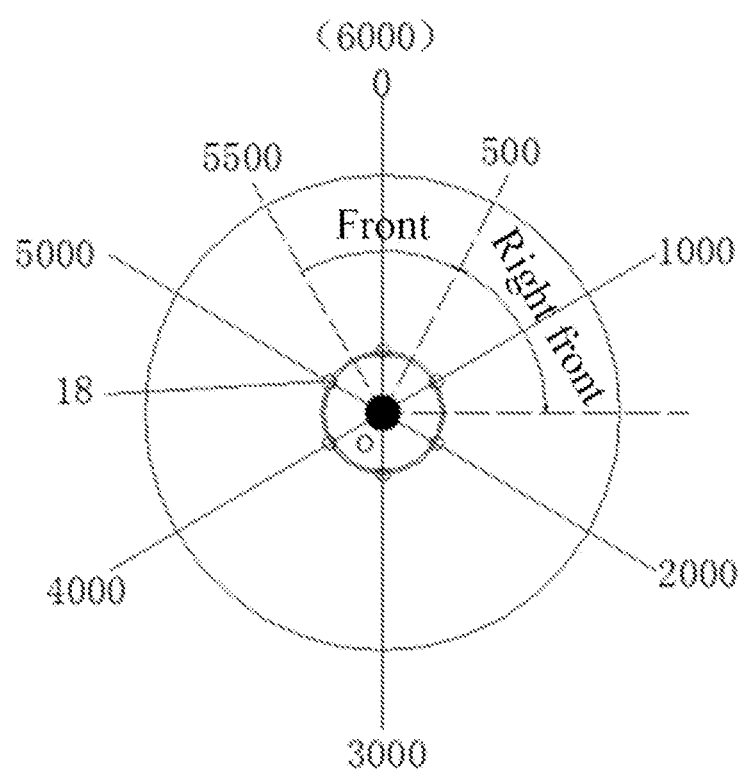
FIG. 6 is a schematic diagram of wounded directions and feedback force.

In actual use, conversion of each direction into a physical direction should be subjected to certain correction to form an area value, which is an anchoring revision algorithm. As shown in FIG. 6, the position of a certain team member is point O. When six force feedback devices are arranged, every 1000 corresponds to one direction, and the device has six directions in total. At the moment, six feedback areas are formed, and military directions can be corrected by −500. If the front force feedback areas are in the range of 5500 to 6000 and the range of 0 to 500, the right front feedback area is in the range of 501 to 1500. Each direction is calculated, and attack directions in the real world are calculated according to the physical force feedback in the six directions on the tactical vest. The attack directions are transmitted to the hit sensing devices on the body of the trainee, so that hit vibration information is sent out.

Finally, it is noted that the above-mentioned embodiments are only used for illustrating the technical scheme of the present disclosure but not restricting the scope of protection of the present disclosure; and although the present disclosure is described in detail by reference to a better embodiment, those ordinary skilled in the art should understand that the technical scheme of the present disclosure can be amended or equally substituted but not departing from the purpose and scope of the technical scheme of the present disclosure and should be contained in the scope of claims of the present disclosure.

What is claimed is:

1. A mixed reality high-simulation battlefield first aid training platform, wherein the mixed reality high-simulation battlefield first aid training platform comprises a hardware part and a software part; the hardware part comprises a data processing system, a real-time monitoring system, a head-mounted display device, an intelligent shooting instrument, a wearable sensing instrument, and a manipulation handle; the software part comprises a three-dimensional (3D) battlefield scene simulation system, a 3D wounded simulation system, a wounded rescue decision system, and a movable large space team cooperation and virtual interaction system;

the 3D battlefield scene simulation system comprises a geographic environment 3D model and a battle scene 3D model;

the geographic environment 3D model comprises a terrain layer, a ground surface layer, a vegetation layer, a building layer and an environment layer; the terrain layer is used for restoring a terrain structure and a form of training environment; the ground surface layer is used for restoring ground surface form; the vegetation layer is used for restoring vegetation conditions; the building layer is used for restoring a building structure and appearance; the environment layer is used for restoring ambient light and weather;

the battle scene 3D model comprises trainees, weapon equipment, battle cooperation, battle atmosphere creation, a battle process and the like;

the 3D wounded simulation system performs high-simulation wounded simulation through a 3D next-generation modeling technology, performs 1:1 simulation on a size, a shape and a color of a wound surface, and represents dynamic wounded conditions by setting dynamic conditions to trigger and call animations corresponding to different wounded conditions;

the wounded rescue decision system forms a training system structure diagram according to a self-rescue and mutual rescue decision process, and then a visual graphic editing environment provided by a virtual engine Unreal Engine 4 (UE4) is used for programming and battlefield first aid decision-making ability of trainees;

according to the movable large space team cooperation and virtual interaction system, virtual world root points of the trainees are anchored to anchoring points of a physical world through a space anchoring sharing core technology and an inside-out tracking positioning technology, so that the trainees at different positions complete error-free multi-person interaction relative to virtual world positions and physical world positions to achieve team cooperation;

the data processing system comprises a personal computer (PC) terminal in wireless connection with the real-time monitoring system, the head-mounted display device, the intelligent shooting instrument, the wearable sensing instrument and the manipulation handle; the PC terminal is provided with a wireless communication module; the wireless communication module is used for receiving monitoring information or a handle instruction and sending out a shooting instruction, a wearable sensing instruction and a head-mounted display instruction;

the real-time monitoring system comprises an audio and video acquisition device, an audio and video transmission device and a storage device; the audio and video acquisition device performs whole-process camera shooting on whole appearance and walking space of each trainee; the audio and video transmission device receives a signal and transmits the signal to the PC terminal;

the head-mounted display device is worn on a head of a human body and is connected with the PC terminal through wireless communication to provide a virtual picture;

the intelligent shooting instrument comprises a firearm, a cartridge holder replacing simulation device and a recoil force simulation device arranged on the firearm; cartridge holder replacing operation is sensed through the cartridge holder replacing simulation device; acting counterforce of 6 N/cm$^2$ is generated on the human body through the recoil force simulation device; and the wearable sensing instrument comprises a tactical vest and a hit sensing device arranged on the tactical vest.

2. The mixed reality high-simulation battlefield first aid training platform according to claim 1, wherein the 3D wounded simulation system presents the shape of the wound surface through real normal and maps, depicts convex-concave changes of the wound surface with normal maps, represents the color and texture of the wound surface with colored maps, and represents quality of the wound surface under light irradiation condition with highlight maps.

3. The mixed reality high-simulation battlefield first aid training platform according to claim 1, wherein the cartridge holder replacing simulation device comprises a touch sensor arranged on the firearm, and the touch sensor interacts with the data processing system through wireless communication.

4. The mixed reality high-simulation battlefield first aid training platform according to claim 1, wherein the recoil force simulation device comprises a fixed seat fixed to a tail portion of the firearm and an impact rod; a magnetic force generation cavity coaxially arranged with an axis direction of the firearm is formed in the fixed seat; an opening is formed in an end, away from the firearm, of the magnetic force generation cavity; an end of the impact rod is arranged in the magnetic force generation cavity through the opening, and an other end of the impact rod extends out of a cylinder body; an iron piston is arranged at the end, in the cylinder body, of the impact rod; an electromagnet is arranged in a cavity formed by the iron piston and the opening; the electromagnet is annularly sleeved on the impact rod; an annular space is formed between the electromagnet and the impact rod; a reset spring is arranged in the annular space; and an impact handle is arranged at the other end, extending out of the cylinder body, of the impact rod.

5. The mixed reality high-simulation battlefield first aid training platform according to claim 1, wherein a plurality of hit sensing devices are provided, and evenly distributed on a same circumference of the tactical vest.

6. The mixed reality high-simulation battlefield first aid training platform according to claim 5, wherein the hit sensing device comprises a micro vibration motor, a vibration power supply and an electromagnetic switch valve, and the electromagnetic switch valve wirelessly communicates with the data processing system.

7. A training method using a mixed reality high-simulation battlefield first aid training platform, wherein the mixed reality high-simulation battlefield first aid training platform comprises a hardware part and a software part; the hardware part comprises a data processing system, a real-time monitoring system, a head-mounted display device, an intelligent shooting instrument, a wearable sensing instrument, and a manipulation handle; the software part comprises a three-dimensional (3D) battlefield scene simulation system, a 3D wounded simulation system, a wounded rescue decision system, and a movable large space team cooperation and virtual interaction system;

the 3D battlefield scene simulation system comprises a geographic environment 3D model and a battle scene 3D model;

the geographic environment 3D model comprises a terrain layer, a ground surface layer, a vegetation layer, a building layer and an environment layer; the terrain layer is used for restoring a terrain structure and a form of training environment; the ground surface layer is used for restoring ground surface form; the vegetation layer is used for restoring vegetation conditions; the building layer is used for restoring a building structure and appearance; the environment layer is used for restoring ambient light and weather;

the battle scene 3D model comprises trainees, weapon equipment, battle cooperation, battle atmosphere creation, a battle process and the like;

the 3D wounded simulation system performs high-simulation wounded simulation through a 3D next-generation modeling technology, performs 1:1 simulation on a size, a shape and a color of a wound surface, and represents dynamic wounded conditions by setting dynamic conditions to trigger and call animations corresponding to different wounded conditions;

the wounded rescue decision system forms a training system structure diagram according to a self-rescue and mutual rescue decision process, and then a visual graphic editing environment provided by a virtual engine Unreal Engine 4 (UE4) is used for programming and battlefield first aid decision-making ability of trainees;

according to the movable large space team cooperation and virtual interaction system, virtual world root points of the trainees are anchored to anchoring points of a physical world through a space anchoring sharing core technology and an inside-out tracking positioning technology, so that the trainees at different positions complete error-free multi-person interaction relative to virtual world positions and physical world positions to achieve team cooperation;

the data processing system comprises a personal computer (PC) terminal in wireless connection with the real-time monitoring system, the head-mounted display device, the intelligent shooting instrument, the wearable sensing instrument and the manipulation handle; the PC terminal is provided with a wireless communication module; the wireless communication module is used for receiving monitoring information or a handle instruction and sending out a shooting instruction, a wearable sensing instruction and a head-mounted display instruction;

the real-time monitoring system comprises an audio and video acquisition device, an audio and video transmission device and a storage device; the audio and video acquisition device performs whole-process camera shooting on whole appearance and walking space of each trainee; the audio and video transmission device receives a signal and transmits the signal to the PC terminal;

the head-mounted display device is worn on a head of a human body and is connected with the PC terminal through wireless communication to provide a virtual picture;

the intelligent shooting instrument comprises a firearm, a cartridge holder replacing simulation device and a recoil force simulation device arranged on the firearm; cartridge holder replacing operation is sensed through the cartridge holder replacing simulation device; acting counterforce of 6 N/cm$^2$ is generated on the human body through the recoil force simulation device; and the wearable sensing instrument comprises a tactical vest and a hit sensing device arranged on the tactical vest;

wherein anchoring virtual world root points of all trainees to anchoring points of a real world through a space anchoring sharing technology so that the trainees at different positions complete error-free multi-person interaction relative to the virtual world position and the physical world position, and then performing large-space team cooperation training in combination with an inside-out tracking positioning method; and the training method specially comprises following steps:

wearing the display device, creating a room in a virtual world of the display device through the manipulation handle, selecting a mode and a level, and waiting for team members;

entering all team members to a preparation area in a real world after gathering is completed;

entering a team leader to the preparation area to confirm normal wireless communication of each hardware and normal use of each software, and triggering a start area to start training;

according to display of the display device, enabling the team members to travel in the physical world and to be synchronous with the virtual world, shooting and avoiding enemies through enemy AI, sensing behavior of shooting through the recoil force simulation device, sensing a hit signal through the hit sensing device, and triggering a wounded event;

processing wounded condition information and direction information by the PC terminal and then immediately transmitting processed information to the team leader through the 3D wounded simulation system when one of the team members falls to ground after the one is hit, and giving a wounded rescue command by the team leader according to immediate conditions;

making a comprehensive determination by assigned rescue personnel according to enemy's situations, self-situations, battlefield environment and other situations to implement rescue; and completing rescue;

wherein if the mode is a training mode, completing a tactical task and finishing the rescue is an end of the training; and if the mode is an assessment mode, team scoring in aspects of organizing, commanding and team cooperation, tactical task completion and rescue task completion are performed, and finishing the team scoring is an end of the training.

8. The method according to claim 7, wherein according to the space anchoring sharing technology, 3D center positioning is performed on each real site through a virtual reality device, data alignment is performed on physical world center 3D coordinates and virtual world center 3D coordinates of the real site through a processor, and finally a client/server (C/S) server is established through a network to synchronize the virtual world center 3D coordinates of each team member; and aligned coordinates of virtual world and physical world of each team member are calculated to perform data synchronization in 3D space and 3D display in VR space.

9. The method according to claim 8, wherein a feedback method of wounded directions and feedback force comprises following steps: establishing a military azimuth coordinate system by taking a position of the team member as a coordinate center, performing reference calculation by taking military azimuth coordinates of 0-6000 to correspond to 360 degrees so that any azimuth coordinate value corresponds to an angle value, arranging force feedback devices on a circumference of the tactical vest at certain angle intervals, and sending out feedback information by one corresponding force feedback device in a wounded direction which is an included angle between an attacking direction of an attacker and an attacked person in the coordinate system.

10. The method according to claim 7, wherein the 3D wounded simulation system presents the shape of the wound surface through real normal and maps, depicts convex-concave changes of the wound surface with normal maps, represents the color and texture of the wound surface with colored maps, and represents quality of the wound surface under light irradiation condition with highlight maps.

11. The method according to claim 7, wherein the cartridge holder replacing simulation device comprises a touch sensor arranged on the firearm, and the touch sensor interacts with the data processing system through wireless communication.

12. The method according to claim 7, wherein the recoil force simulation device comprises a fixed seat fixed to a tail portion of the firearm and an impact rod; a magnetic force generation cavity coaxially arranged with an axis direction of the firearm is formed in the fixed seat; an opening is formed in an end, away from the firearm, of the magnetic force generation cavity; an end of the impact rod is arranged in the magnetic force generation cavity through the opening, and an other end of the impact rod extends out of a cylinder body; an iron piston is arranged at the end, in the cylinder body, of the impact rod; an electromagnet is arranged in a cavity formed by the iron piston and the opening; the electromagnet is annularly sleeved on the impact rod; an annular space is formed between the electromagnet and the impact rod; a reset spring is arranged in the annular space; and an impact handle is arranged at the other end, extending out of the cylinder body, of the impact rod.

13. The method according to claim 7, wherein a plurality of hit sensing devices are provided, and evenly distributed on a same circumference of the tactical vest.

14. The method according to claim 13, wherein the hit sensing device comprises a micro vibration motor, a vibration power supply and an electromagnetic switch valve, and the electromagnetic switch valve wirelessly communicates with the data processing system.

* * * * *